A. HAJIAN.
WATER FAUCET ATTACHMENT.
APPLICATION FILED MAY 4, 1920.

1,366,795.

Patented Jan. 25, 1921.

A. Hajian.
INVENTOR

BY Victor J. Evans
ATTORNEY

WITNESS:

UNITED STATES PATENT OFFICE.

ARAM HAJIAN, OF BROOKLYN, NEW YORK.

WATER-FAUCET ATTACHMENT.

1,366,795.  Specification of Letters Patent.  Patented Jan. 25, 1921.

Application filed May 4, 1920. Serial No. 378,777.

*To all whom it may concern:*

Be it known that I, ARAM HAJIAN, a citizen of the United States, residing at Brooklyn, in the county of Kings and State of New York, have invented new and useful Improvements in Water-Faucet Attachments, of which the following is a specification.

This invention relates to improvements in water faucet attachments and has for its principal object the producing of convenient means connecting hot and cold water faucets of a sink, bath tub or the like.

Another object is to provide a device of this nature which is easily adjustable to accommodate the varying distances between the hot and cold water faucets.

A further object is to provide means whereby the attachment may be readily secured to either hose bibs or plain bibs or to one of each.

Further objects will appear in the following description and claim. All of these objects are obtained by means shown in the accompanying drawing consisting of one sheet in which:—

Like characters of reference refer to like parts throughout the several views.

Figure 1:
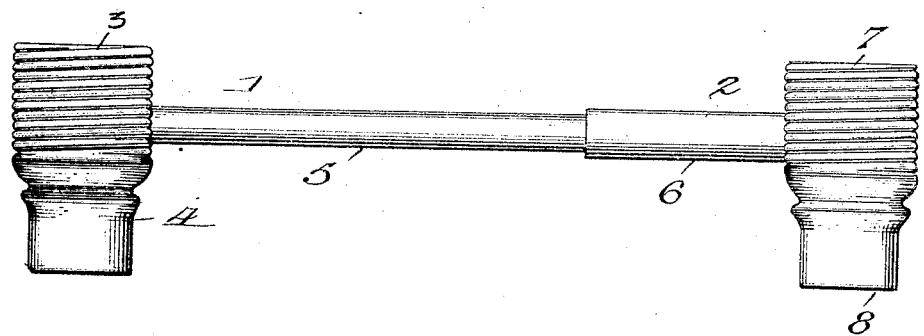
Figure 1 is a side elevation of my improved device.
Figure 2:
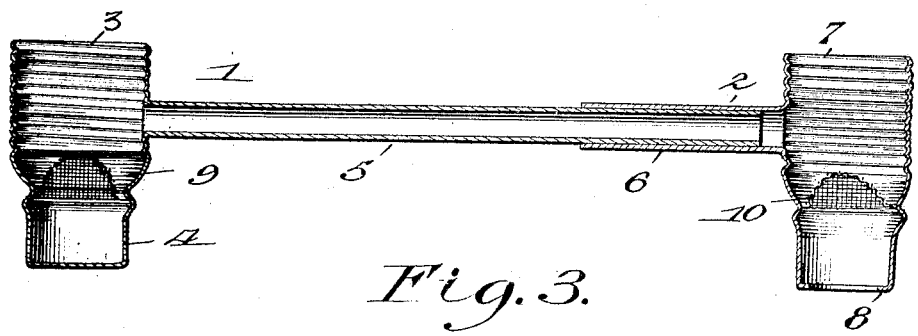
Fig. 2 is a vertical sectional view of the same.
Figure 3:
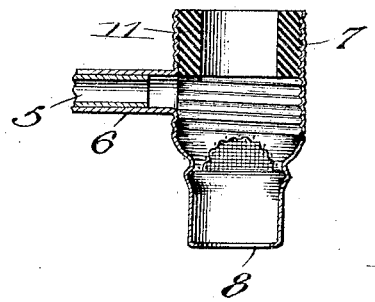
Fig. 3 is a vertical sectional view of one of the attachments, showing the washer for adapting the device to use on plain bibs.

This invention contemplates the combining of two hollow substantially T-shaped members, each of which may be secured to a faucet of a sink or bath tub, one of the branches of one of these members telescoping into a branch of the other, and one of the members having one of its branches sealed while the corresponding branch of the other forms an outlet for the water from both faucets.

Referring more particularly to the drawings, 1 and 2 represent the two sections of my device, each being substantially T shaped as shown. I prefer to attach the member 1 to the hot water faucet and the member 2 to the cold, but either member may be connected to either faucet desired.

The member 1 is provided with threaded branch 3 to fit on a hose bib or threaded faucet and with a branch 4 which is sealed up, and with an extended branch 5, which telescopes with a similar branch 6 of the member 2. The member 2 also comprises besides the branch 6, a branch 7 which is threaded to fit on a hose bib or threaded faucet and with an outlet branch 8 which permits egress of the water.

A strainer is placed at 9 in member 1 to act as a filter and another is placed at 10 in member 2 to serve both as a filter and antisplash device.

A washer 11 of rubber may be placed in branch 3 or branch 7 in case the device is to be attached to a plain bib or unthreaded faucet. This is provided because sinks and washtubs are usually provided with one plain bib and one hose bib, and it is necessary to provide means for fitting into the threaded branch of the device for gripping the plain bib.

If desired, branches 5 and 6 may be made merely as nipples which may be connected by a rubber tube or hose.

While I have described what I consider to be the most desirable embodiment of my invention it is obvious that many details may be varied without in any way departing from the spirit of my invention and I do not wish to be considered as limiting myself to the exact details of construction herein shown nor to anything less than the whole of my invention limited only by the appended claim.

Now having described my invention what I claim is new and desire to secure by Letters-Patent is:—

In a device of the class described, the combination of two hollow members each adapted to be secured to a faucet and one being provided with an outlet, and tubular extensible means connecting said members substantially as for the purpose described.

In testimony whereof I have affixed my signature.

ARAM HAJIAN.